United States Patent
Kanner et al.

(10) Patent No.: US 10,277,309 B2
(45) Date of Patent: Apr. 30, 2019

(54) PREDICTING RADIO FREQUENCY INTERFERENCE EVENTS

(71) Applicant: Planet Labs, Inc., San Francisco, CA (US)

(72) Inventors: Laurren Kanner, Mountain View, CA (US); Craig RayDean Scheffler, Lafayette, CO (US)

(73) Assignee: Planet Labs, Inc., San Francisco, CA (US)

( * ) Notice: Subject to any disclaimer, the term of this patent is extended or adjusted under 35 U.S.C. 154(b) by 609 days.

(21) Appl. No.: 14/945,836

(22) Filed: Nov. 19, 2015

(65) Prior Publication Data

US 2017/0146664 A1  May 25, 2017

(51) Int. Cl.
*H04B 7/185*  (2006.01)

(52) U.S. Cl.
CPC ................. *H04B 7/18513* (2013.01)

(58) Field of Classification Search
CPC  H04B 7/18528; H04B 7/18513; H04B 7/185; H04B 7/195; H04B 7/19
See application file for complete search history.

(56) References Cited

U.S. PATENT DOCUMENTS

| | | | | |
|---|---|---|---|---|
| 5,926,758 | A * | 7/1999 | Grybos | H04B 7/18513 455/13.1 |
| 6,088,572 | A * | 7/2000 | Vatt | B64G 1/1007 455/12.1 |
| 7,551,118 | B2 | 6/2009 | Hellsten | |
| 8,666,311 | B2 | 3/2014 | Lang et al. | |
| 2007/0168675 | A1 | 7/2007 | Wahlberg et al. | |
| 2009/0093213 | A1 * | 4/2009 | Miller | H04B 7/18528 455/12.1 |
| 2013/0310068 | A1 | 11/2013 | Fischer et al. | |
| 2014/0145887 | A1 * | 5/2014 | Irvine | H01Q 3/08 343/713 |

FOREIGN PATENT DOCUMENTS

WO  WO 98/09386  3/1998

OTHER PUBLICATIONS

International Search Report from PCT/US2016/062009 dated Feb. 22, 2017—16 pages.

* cited by examiner

*Primary Examiner* — Dong-Chang Shiue
(74) *Attorney, Agent, or Firm* — Dority & Manning, P.A.

(57) ABSTRACT

Systems and methods for determining a communication schedule for a satellite system are provided. For instance, orbital data indicative of one or more orbital elements of a first satellite system and one or more second satellite systems can be obtained. Frequency data frequency data indicative of one or more frequencies at which the one or more second satellite systems transmit data can also be obtained. One or more expected radio frequency interference events associated with the first satellite system can then be determined based at least in part on the orbital data and the frequency data. One or more downlink periods during which data is transmitted by the first satellite and one or more silent periods during which data is not transmitted by the first satellite can then be scheduled based at least in part on the expected radio frequency interference events.

20 Claims, 6 Drawing Sheets

PREDICTING RADIO FREQUENCY INTERFERENCE EVENTS

FIELD

The present disclosure relates generally to satellite systems, and more particularly to systems and methods for determining radio frequency interference events associated with satellite communications.

BACKGROUND

Satellite systems operating in orbit may be configured to communicate with one or more space-based or ground-based assets using radio frequency transmission signals. For instance, satellite systems may be configured to communicate with other orbital satellite systems and/or one or more ground communication stations. As the number of satellite systems in orbit increases, it can become increasingly possible to "mix the data" between such communications. For instance, transmission signals associated with a first satellite system may experience radio frequency interference (RFI) caused by transmission signals associated with a proximate satellite. Such interference may cause interference with commanding the first satellite and/or lost data.

In conventional systems, RFI may not be detected until or after it occurs. In addition, it can be difficult to clearly identify RFI as the cause of the problem, as RFI does not generally have an associated characteristic failure signature. In this manner, RFI may go unconfirmed, and may be included as part of a "normal operational inefficiency" associated with operation of a satellite system.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining a communication schedule for a satellite system. The method includes obtaining, by one or more computing devices, orbital data indicative of one or more orbital elements of a first satellite system and one or more second satellite systems. The method further includes obtaining, by the one or more computing devices, frequency data indicative of one or more frequencies at which the one or more second satellite systems transmit data. The method further includes determining, by the one or more computing devices, one or more expected radio frequency interference events associated with the first satellite system based at least in part on the orbital data and the frequency data. The method further includes scheduling, by the one or more computing devices, one or more downlink periods during which data is transmitted by the first satellite and one or more silent periods during which data is not transmitted by the first satellite based at least in part on the expected radio frequency interference events.

Other example aspects of the present disclosure are directed to systems, apparatus, tangible, non-transitory computer-readable media, user interfaces, memory devices, and electronic devices for predicting and/or avoiding radio frequency interference events.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
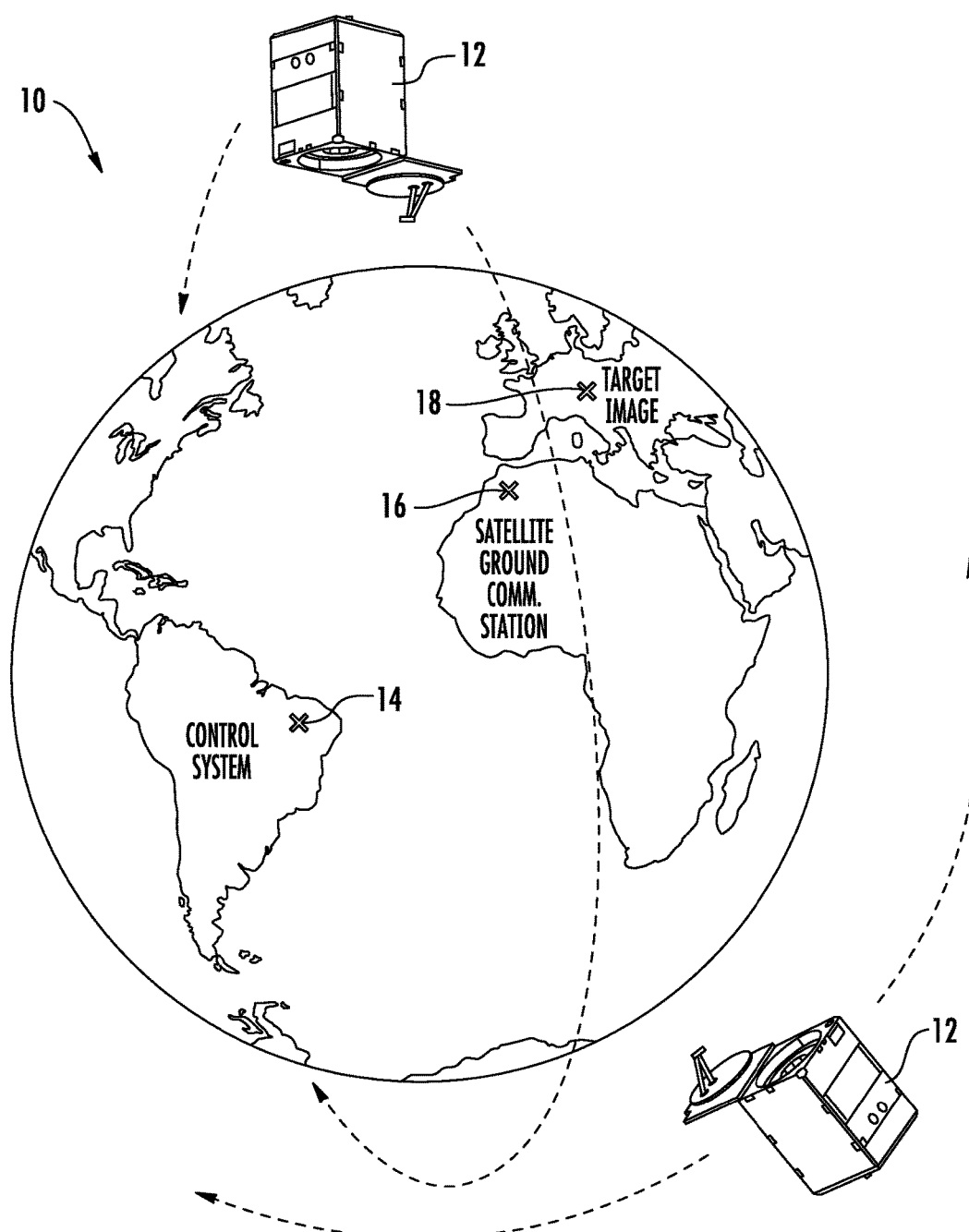
FIG. 1 depicts an example satellite communication system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to predicting radio frequency interference events associated with a satellite system. For instance, data indicative of an orbital trajectory or path can be obtained for a first satellite system and one or more second satellite systems. Data indicative of the transmission frequencies of the one or more second satellite systems can further be obtained. One or more expected radio frequency interference events associated with the first satellite system can be determined based at least in part on the trajectory data and the frequency data. A scheduling system for the first satellite system can then be updated based at least in part on the expected interference events. For instance, the scheduling system can be updated to include one or more downlink periods during which data is transmitted by the first satellite to a ground communication station, and one or more silent periods during which no data is transmitted by the first satellite to the ground communication station. In particular, the one or more silent periods can be determined to correspond to the one or more interference events.

More particularly, the data indicative of the orbital trajectories of the satellite systems can include orbital elements associated with each satellite system. The orbital elements can be parameters used to determine an orbit of the satellite. In particular, such orbital elements can be used to determine one or more orbital states of the satellite. An orbital state can specify a position and/or velocity of the satellite at a given point in time. For instance, the orbital elements can be used to determine a previous state of the satellite, or the orbital elements can be used to predict or estimate a future state of the satellite. In this manner, a projected trajectory or path can be determined for the satellite. In some implementations, the data indicative of the orbital trajectories (e.g. the orbital elements) can be encoded in a two-line element set (TLE) format. In particular, the TLE format can include two lines of 80-column ASCII text to store the data.

The data indicative of the transmission frequencies can specify one or more frequency ranges over which data is communicated by the satellite systems. In some implementations, some satellite systems may use different frequencies for different operations. For instance, a satellite system may transmit data at one frequency, and may receive data at a different frequency.

In some implementations, the data indicative of the transmission frequency of the satellite systems can be used to identify one or more satellites that are relevant to a first satellite system. A relevant satellite can be a satellite system operating within a threshold frequency range of the first satellite system. For instance, one or more known frequencies associated with the first satellite can be compared to the frequency data for a plurality of additional satellites to determine the relevant satellites. In example embodiments, the first satellite and the additional satellites may be controlled by a single entity, or may be controlled by multiple entities. Orbital data may then be identified or otherwise obtained for the relevant satellites. An expected orbital trajectory can then be determined for the relevant satellites based at least in part on the orbital data. The orbital trajectories can be compared to an expected orbital trajectory of the first satellite system to determine or predict one or more potential radio frequency interference (RFI) events.

The potential RFI events can be determined based at least in part on the orbital data and the frequency data. In particular, an RFI event can be determined for one or more periods of time during which two or more satellite systems operating within a threshold frequency range from each other (e.g. relevant satellites) are (or are expected to be) separated by less than a threshold distance (e.g. a threshold angle), as determined from the orbital data. For instance, in some implementations, an RFI event can correspond to a period of time when a first satellite and one or more relevant satellites will be separated by less than a threshold conjunction angle relative to an antenna communicating with at least one of the satellite systems. The threshold conjunction angle can correspond to an acceptable level of degradation in the signal-to-noise ratio associated with the signal received by the antenna. In some implementations, the threshold conjunction angle can be determined based at least in part on a radiation pattern of an antenna associated with one of the satellite systems. In some implementations, the threshold conjunction angle can be determined based at least in part on various other characteristics associated with the satellite and/or antenna, such as the transmission power of the satellite, the received noise of the antenna, and/or other characteristics. For instance, the antenna can be located at a ground station associated with one of the satellite systems. In particular, the ground station can include one or more computing devices configured to communicate with the first satellite system using RF transmission signals. In this manner, the RFI event can be predicted for a period of time wherein each satellite system will be visible by the antenna pattern.

In some implementations, an RFI event can be determined between a first satellite system and one or more relevant satellite systems based at least in part on an elevation angle of the first satellite system and the relevant satellite system(s) relative to a ground station associated with the first satellite system. For instance, in some implementations, an RFI event can be determined between a first satellite system and one or more relative satellite systems based at least in part on an elevation angle of the satellite systems and a conjunction angle between the satellite systems. In particular, an RFI event can be determined for a period of time when a first satellite system and one or more relevant satellite systems are expected to be above a minimum elevation angle relative to the ground station, and when the satellites are expected to be separated by less than the threshold conjunction angle.

In some implementations, a duration of an RFI event can be determined. For instance, an RFI event can last for the period of time wherein a first satellite system and one or more relevant satellite systems are above a minimum elevation angle relative to a ground station, and are separated by less than a threshold conjunction angle.

In response to determining an RFI event associated with a satellite, a scheduling system associated with the satellite can be updated. The scheduling system can be configured to generate a schedule of events associated with the satellite by incorporating and analyzing a number of inputs, parameters, and/or variables to produce timely, efficient, and valuable use of the satellite, and/or one or more additional satellites within a constellation of satellites. For instance, for an imaging satellite, events can be any task to be performed by the imaging satellite and can generally include, without limitation, imagery collection, imagery downlink (e.g., to a satellite ground communication station), and/or onboard maintenance.

According to example aspects of the present disclosure, updating the scheduling system can include determining one or more silent periods associated with data downlink based at least in part on the determined RFI events. In particular, a silent period can be a period of time wherein a satellite system does not transmit data (e.g. payload data or other data) to the ground station. In some implementations, an RFI event and/or an associated silent period can correspond to a particular ground station. In this manner, during a silent period corresponding to a particular ground station, the satellite system may still be configured to transmit data to a different ground station. As indicated, the silent periods can correspond to a predicted RFI event. For instance, a silent period can be scheduled for the entirety of the duration of a predicted RFI event. In some implementations, one or more silent periods may interrupt an otherwise continuous data downlink period. For instance, if an RFI event is determined during a period of time when a downlink period is scheduled, the downlink period can be interrupted by a silent period corresponding to the RFI event. In this manner, data loss due to RFI can be reduced or eliminated. As another example, at least a portion of a downlink period may be moved or rescheduled based at least in part on a determined RFI event, such that data is transmitted to a different ground station. For instance, payload data that is scheduled to be transmitted during a downlink period that corresponds to an RFI event can be rescheduled, such that at least a portion of the payload data is transmitted to a different ground station not associated with the RFI event.

With reference now to the figures, example aspects of the present disclosure will be described in more detail. For instance, FIG. 1 depicts a representation of example constellation 10 of satellites 12 in a low-earth orbit, a control system 14, a ground communication system 16, and an example of a target image area 18. For instance, in some implementations, satellites 12 can include one or more imaging satellites. Embodiments of the systems and methods described herein can be used to schedule events in the constellation 10 including, for example, determining which satellite 12 is to acquire an image of the target image area 18, when the image is to be acquired, when the image is to be communicated to the ground communication system 16, and/or other scheduling events. The image can include a plurality of images, video, etc. In some implementations, the satellites 12 can include an image acquisition system configured to acquire multi-spectral and/or pan-spectral images or videos of the target image area 18. The satellites 12 can be owned and/or operated by a single entity or multiple entities. Although only two satellites 12 are depicted, it will be appreciated that, in various implementations, the constellation 10 may include any suitable number of satellites. Although FIG. 1 shows an example constellation of microsatellites 12, in other implementations the constellation 10 can include additional or different types of satellites including telecommunications satellites, mini-satellites, and so forth.

The control system 14 can include functionality that implements embodiments of the scheduling system disclosed herein so as to schedule events in the constellation. For example, the control system 14 can include embodiments of the control system 400 described with reference to FIG. 3. In particular, the control system 14, 400 can include the scheduler 404 described with reference to FIG. 3. Scheduled events can include one or more tasks to be performed, data to be collected, information to be received or transmitted, duration, desired start time, desired end time, desired results, or any combination of these. For example, for an imaging satellite, events can be any task to be performed by the imaging satellite and can generally include, without limitation, imagery collection (e.g., of the target image area 18), imagery downlink (e.g., to the satellite ground communication station 16), and onboard maintenance.

Figure 2:
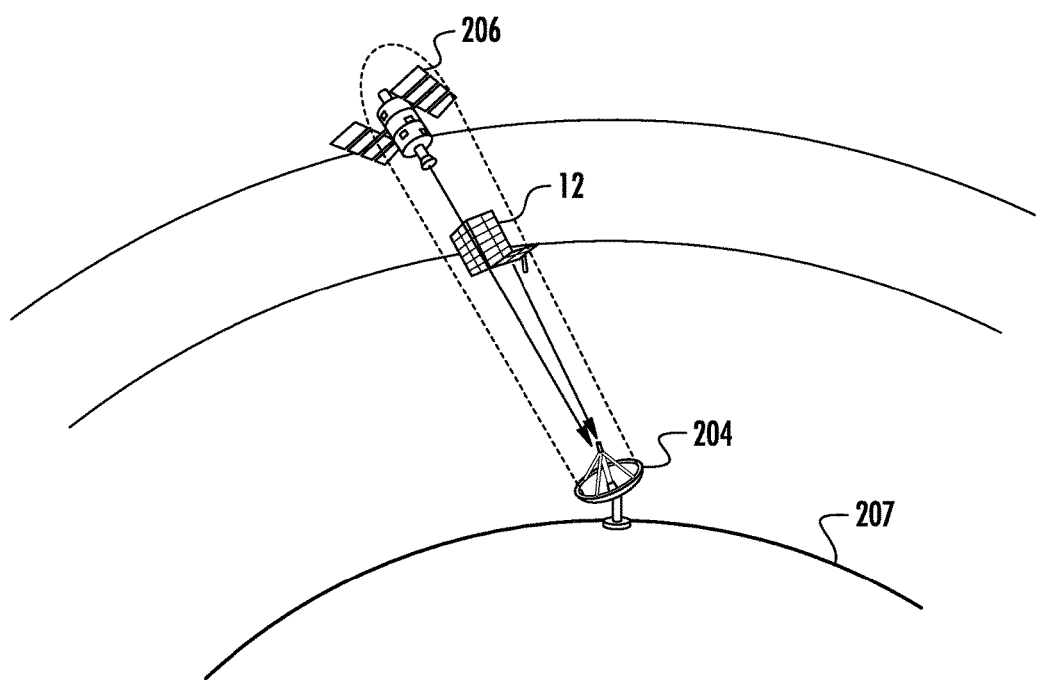
FIG. 2 depicts example satellite systems in orbit according to example embodiments of the present disclosure.

As satellites 12 travel along their orbital paths, they may encounter one or more additional satellites. Such satellites may be included in constellation 10 or in a different constellation. For instance, FIG. 2 depicts satellite 12 traveling on an orbital path relative to the earth 207. In particular, satellite 12 can be configured to transmit data to a ground station 204 when satellite 12 comes into view of ground station 204. For instance, in embodiments wherein satellite 12 is an imaging satellite, satellite 12 can be configured to downlink imagery data to ground station 204 during one or more downlink periods.

FIG. 2 further depicts satellite 206. Satellite 206 is traveling in an orbital path relative to the earth 207. As satellites 12 and 206 each travel along their respective orbital paths, they may periodically simultaneously come into view of ground station 204. In such instances, downlink signals received by ground station 204 (e.g. provided by satellite 12) may experience degradation due at least in part to RFI caused by satellite 206. For instance, satellite 206 may be configured to transmit data to a nearby ground station while satellite 12 is downlinking data to ground station 204, such that a transmission beam of satellite 206 covers the area of ground station 204. In instances wherein satellite 12 and satellite 206 transmit data using overlapping frequencies, such simultaneous signal transmissions may interfere with each other, which can cause degradation in the signals received by ground station 204 and/or the nearby ground station. Such interference can cause data loss during the downlink period. As another example, such interference can cause interference in commanding satellite 12 and/or satellite 206.

Figure 3:
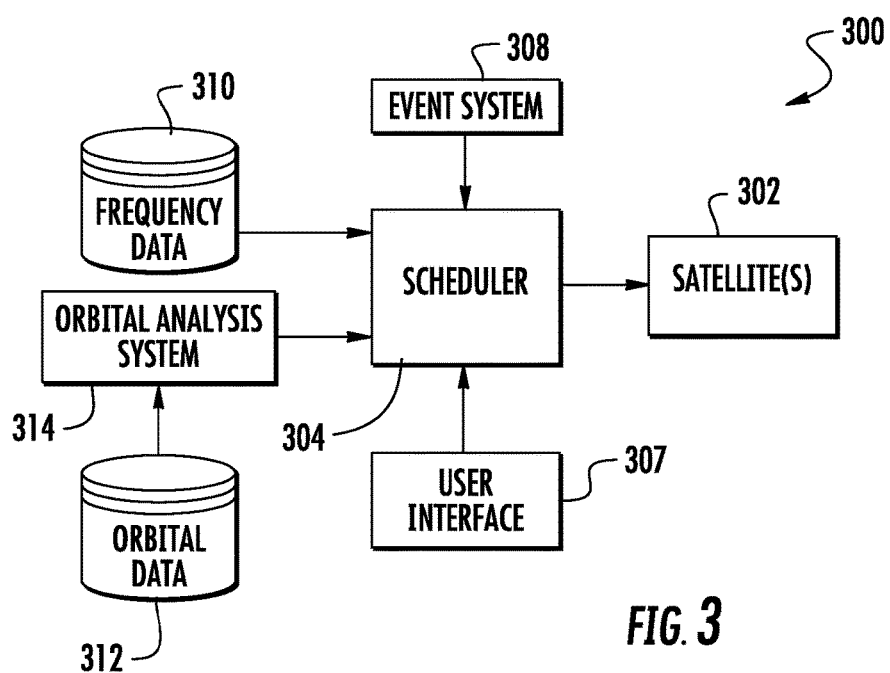
FIG. 3 depicts an overview of an example control system for determining interference events according to example embodiments of the present disclosure.

FIG. 3 depicts an overview of an example control system 300 for predicting RFI events according to example embodiments of the present disclosure. The control system 300 can control one or more satellites 302 by analyzing information (e.g., events to be performed, priorities of events, event or satellite constraints, etc.), creating an efficient schedule of events based at least in part on the analyzed information, and commanding the satellites to perform the scheduled events. For instance, satellite(s) 302 may correspond to satellite 12, 206, and/or other satellite. In some implementations, satellite(s) 302 may correspond to various other suitable devices capable of communicating using RF transmission signals. The control system 300 includes a scheduler 304 configured to receive information about events, priorities, and constraints and to produce a schedule of events. The control system 300 can be configured to produce a schedule and command the satellites 302 to accomplish the events on the schedule in a relatively efficient manner while satisfying defined constraints. The control system 300 can be configured to update the schedule to, for instance, dynamically incorporate new tasks, modify existing tasks, remove tasks, add constraints, modify constraints, remove constraints, modify priorities, or any combination of these.

The control system 300 includes a scheduler 304 configured to produce an efficient or optimized schedule of events. A schedule of events can include, for example, a list of events, tasks, activities, or routines for one or more satellites and corresponding start times of each event. The scheduler 304 receives events from an event system 308, frequency data from a frequency database 310, and/or orbital trajectory data for one or more satellites from an orbital analysis system 314. As indicated, the scheduler 304 can produce a schedule of events. The schedule of events can be associated with a particular satellite 302 or it can be a global schedule with events to be performed by one or more satellites 302. Thus, the scheduler 304 can produce a globally optimal or near-optimal schedule for a plurality of satellites 302, such as satellites in a constellation of satellites.

Data indicative of the schedule of events can be provided to the satellites 302. For instance, in some implementations, control system 300 can include an array of antennas configured to transmit tasking data indicative of a schedule to one or more satellites. The satellites can receive the transmitted tasking data and perform the requested tasks at designated times in accordance with the tasking data. In some implementations, the tasking data can be dynamically updated based at least in part on updated scheduling information received from the scheduler 304.

In some embodiments, the satellites 302 comprise satellites configured to respond to control instructions and/or tasking data received from a control system 300. For example, in response to control instructions received from the control system 300, a satellite can adjust its attitude, transfer stored data to a ground station at a designated time, operate an onboard system in a defined manner, perform a maintenance routine, acquire an image with an imaging system, or any combination of these or other suitable operations.

The control system 300 can receive information from the event system 308. The event system 308 can be a system that creates, collects, receives, generates, and/or organizes events to be performed by the satellites 302. An event can be a collection of instructions and/or information as defined by the event system 308, and can include, for example, one or more tasks to be performed, data to be collected, information to be received or transmitted, duration, desired start time, desired end time, desired results, or any combination of these. For example, in embodiments wherein satellite 302 is an imaging satellite, events can be any task to be performed by an imaging satellite and can generally include, without limitation, imagery collection, imagery downlink, and onboard maintenance. Imagery can include still images and/or video. The event system 308 can further collect event requests from other systems. For example, the event system 308 can include a user interface 307 and receive requests from a user. The event system 308 can interface with other systems that aggregate event requests for the satellites 302. The event system 308 can receive or produce event requests based at least in part on a set schedule of events, such as routine scheduled maintenance. The event system 308 can produce event requests based at least in part on satisfaction of defined criteria, such as transmitting information when in range of a receiving station. The event system 308 can transmit an event or list of events to the scheduler 304 at regular intervals, upon request from the control system 300, upon receiving or producing a new event request, or any combination of these.

Scheduler 304 can further be configured to receive orbital trajectory data from orbital analysis system 314. In particular, orbital analysis system 314 can be configured to receive orbital data from an orbital database 312. The orbital data can include orbital parameters and/or elements associated with satellite(s) 302 and one or more additional satellites. For instance, the one or more additional satellites may be controlled by the same entity, or by one or more different entities. Orbital analysis system 314 can be configured to determine an orbital model for the satellites 302 and the one or more additional satellites based at least in part on the orbital data. In particular, orbital analysis system 314 can be configured to estimate or predict a position and/or velocity of a satellite at any given previous or future time based at least in part on the orbital elements.

As indicated, scheduler 304 can further receive frequency data from frequency database 310. The frequency data can be indicative of one or more frequencies at which satellite(s) 302 and the one or more additional satellites operate. In this manner, scheduler 304 can be configured to schedule one or more events for satellite(s) 302 based at least in part on the orbital data and the frequency data.

In particular, scheduler 304 (and/or orbital analysis system 314) can be configured to determine or otherwise predict one or more RFI events associated with satellite(s) 302. As indicated, an RFI event can be predicted for a period of time wherein two or more satellites operating within a threshold frequency range (e.g. relevant satellites) will be within a threshold angle of each other relative to an antenna configured to communicate with at least one of the two or more satellites. For instance, an RFI event can be predicted when two or more relevant satellites will be above a minimum elevation angle relative to a ground station and separated by less than a threshold conjunction angle. In particular, the RFI event can begin when the two or more relevant satellites converge to within the specified threshold conjunction angle and can end when the two or more satellites diverge outside of the threshold conjunction angle. When an RFI event coincides with a scheduled downlink period, one or more silent periods can be scheduled during the RFI event wherein no data is transmitted by the satellite. For instance, the one or more silent periods can interrupt the otherwise continuous downlink period, and can last for the duration of the RFI event(s). In this manner, data transmission can be ceased when two or more satellites are positioned relative to each other such that data transmission from at least one of the satellites may interfere with data transmissions from at least one other satellite.

It will be appreciated that, in some implementations, the scheduler 304 can be a component in a unitary control system 300. It will be further appreciated that the event system 308, frequency database 310, the orbital analysis system 314, and/or the orbital database 312 can be components of a unitary system, part of the control system 300, physically distinct systems, or any combination of these.

Figure 4:
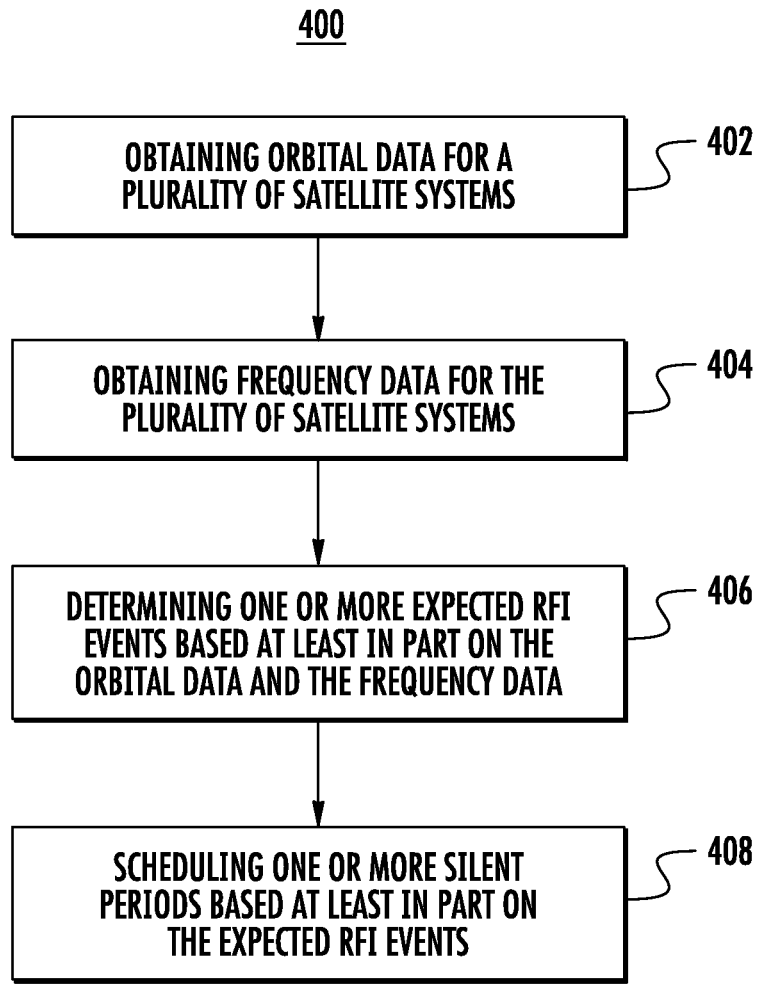
FIG. 4 depicts a flow diagram of an example method of determining a communication schedule according to example embodiments of the present disclosure.

FIG. 4 depicts a flow diagram of an example method (400) of determining RFI events according to example embodiments of the present disclosure. Method (400) can be implemented by one or more computing devices, such as one or more of the computing devices depicted in FIG. 6. In particular implementations, method (400) can be implemented by the orbital analysis system 314 and the scheduler 302 depicted in FIG. 3. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include obtaining orbital data for a plurality of satellite systems. As indicated above, the orbital data may include one or more orbital elements associated with each of the plurality of satellites. The orbital elements can be used to determine one or more orbital states associated with the satellites indicative of a position and/or velocity of the satellites at a given time. The orbital states can be used to determine one or more orbital models associated with the satellites. For instance, the orbital models can be determined using one or more suitable orbital modeling algorithms. The orbital data can further be used to determine one or more angular positions of the plurality of satellites relative to an antenna configured to communicate with the satellites. For instance, angular positions can be determined for two or more satellites relative to a ground communication station located on the earth.

At (404), method (400) can include obtaining frequency data associated with the plurality of satellite systems. The frequency data can specify one or more frequencies or frequency ranges at which the satellites operate. In some implementations, the frequency data may be obtained by accessing one or more databases storing the frequency data. In some implementations, the frequency data may be obtained from a user input. As indicated, a satellite may perform different tasks or operations at different frequencies. For instance, an imaging satellite may transmit (e.g. downlink) imagery data at a first frequency range, and may transmit and/or receive command signals at a second frequency range. In some implementations, the frequency data can be used to determine relevant satellites. In particular, relevant satellites can be satellite systems that operate at overlapping frequencies. As another example, relevant satellites can be satellite systems that operate at frequencies within a threshold range of each other. The relevant satellites may be controlled by a single entity or by different entities.

At (406), method (400) can include determining one or more expected RFI events based at least in part on the orbital data and the frequency data. For instance, in some implementations, the determined orbital models of relevant satellites can be analyzed to identify one or more periods of time wherein two or more relevant satellites will be separated by less than a threshold distance. In particular, an RFI event can correspond to a period of time wherein the orbital data and/or orbital models associated with the two or more satellites indicate that two or more satellites will each be visible by an antenna configured to communicate with at least one of the two or more satellites. In this manner, a threshold conjunction angle can be determined relative to the antenna. The threshold conjunction angle can be determined based at least in part on a radiation pattern of the antenna. An RFI event can then be determined for a period of time wherein the two or more satellites will be within the threshold conjunction angle (as predicted by the orbital models). The threshold conjunction angle can be determined to correspond to a distance between the satellites required to achieve an acceptable signal as received by the antenna. For instance, the threshold conjunction angle can be determined based at least in part on a directivity of the antenna radiation pattern, a power level of the antenna radiation pattern, and/or various other suitable factors.

In some implementations, the RFI event can further be determined based at least in part on an elevation angle relative to a ground station configured to communicate with at least one of the two or more satellites. In particular, a threshold elevation angle can be determined based at least in part on the radiation pattern of an antenna located at the ground station. In such implementations, an RFI event can be determined between the two or more relevant satellites when each of the satellites is above the threshold elevation angle, and when the satellites are separated by less than the threshold conjunction angle.

At (408), method (400) can include scheduling one or more silent periods and/or one or more transmission periods based at least in part on the determined RFI events. For instance, a silent period can be a period of time during which no data is transmitted to or from a satellite, and a transmission period can be a period of time during which data (e.g. imagery data or other data) is transmitted to or from the satellite. In particular, a schedule associated with at least one of the two or more satellites can be determined and/or modified to include the silent period(s). The silent periods can correspond to the RFI events. In instances wherein an RFI event coincides with a previously scheduled transmission period between a satellite and a corresponding ground station, communication can be interrupted during the silent periods. For instance, when the communication involves downlinking imagery data to the ground station, such downlinking can be ceased during the silent periods. The downlinking can then be resumed at the expiration of the RFI event and/or the silent period. In example implementations, the schedule may be automatically determined and/or modified without human interventions based at least in part on the RFI events, or may be determined and/or modified responsive to a user input.

Figure 5:
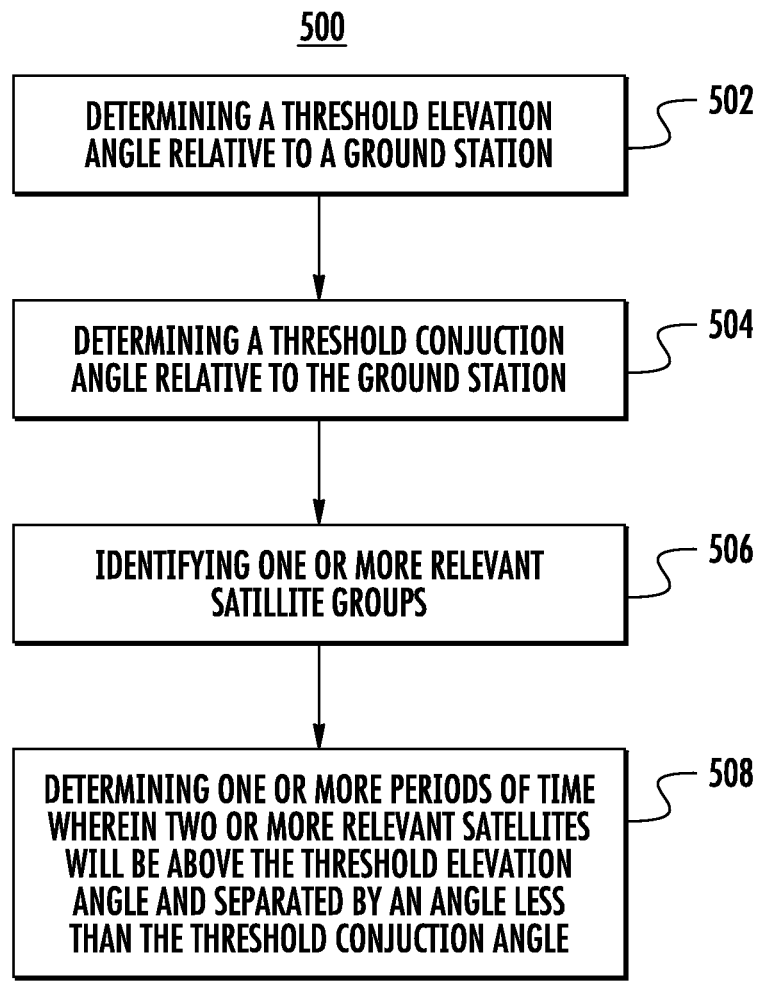
FIG. 5 depicts a flow diagram of an example method of determining RFI events according to example embodiments of the present disclosure.

FIG. 5 depicts a flow diagram of an example method (500) of determining RFI events according to example embodiments of the present disclosure. For instance, method (500) can correspond to particular implementations of (406) of method (400). At (502), method (500) can include determining a threshold elevation angle associated with a ground station. The ground station can be configured to communicate with one or more satellites. For instance, the ground station can be configured to receive imagery data from the one or more satellites during one or more downlink periods. The one or more downlink periods can be scheduled for the satellite(s) when the satellite(s) are in view of the ground station. For instance, a satellite may come into view of the ground station as the satellite passes over the ground station as the satellite orbits the earth. As indicated above, the threshold elevation angle can be determined based at least in part on a radiation pattern of an antenna located at the ground station configured to send signals to and/or receive signals from the one or more satellites.

At (504), method (500) can include determining a threshold conjunction angle relative to the ground station. As indicated above, the threshold conjunction angle can correspond to an amount of separation between a first (e.g. desired) satellite and a second (e.g. interfering) satellite operating at overlapping frequencies that is required to achieve an acceptable signal as received by the ground station antenna from the first satellite and/or an unacceptable signal level from the second satellite as received by the ground station.

At (506), method (500) can include identifying one or more groups of relevant satellites. Relevant satellites may be satellites that transmit communication signals that are capable of interfering with each other. For instance, relevant satellites can be satellites operating at overlapping frequencies. As another example, relevant satellites can be satellites operating at frequencies within a frequency range of each other.

For instance, at least one satellite configured to communicate with the ground station can have one or more associated relevant satellites. The relevant satellites may be controlled by the same entity that controls the satellite configured to communicate with the ground station, or the relevant satellites may be controlled by one or more different entities. In this manner, a relevant satellite group may include one or more satellites configured to communicate with the ground station, and/or one or more satellites configured to communicate with a different destination.

At (508), method (500) can include determining one or more periods of time wherein two or more relevant satellites are above the minimum threshold period, and will be separated by an angle relative to the ground station less than the threshold conjunction angle. Such periods of time can then be identified as RFI event periods. As described above, the RFI event can correspond to the period of time during which the two or more relevant satellites are both above the minimum threshold conjunction angle and within the threshold conjunction angle. Once an RFI event is determined, a schedule associated with at least one of the relevant satellites can be adjusted to include one or more silent periods in accordance with example embodiments of the present disclosure.

Figure 6:
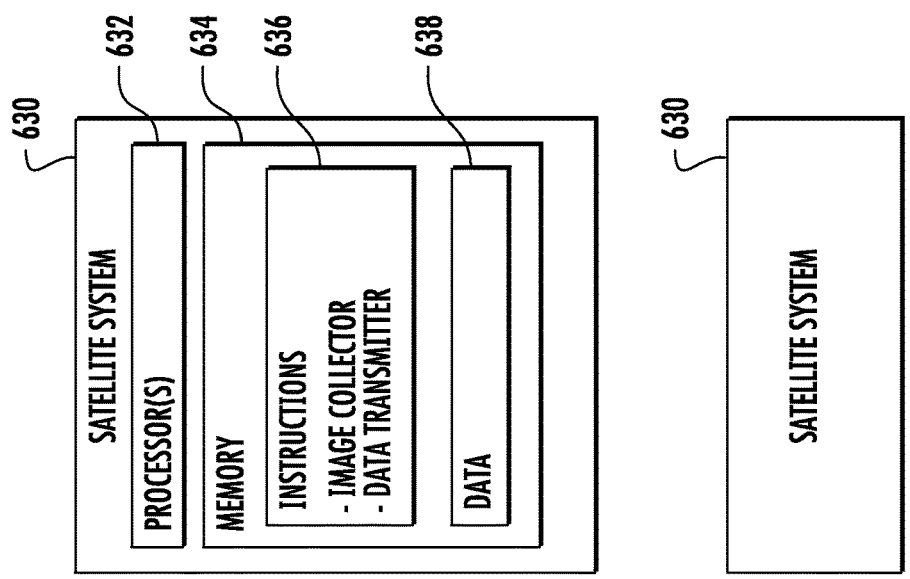
FIG. 6 depicts an example system according to example embodiments of the present disclosure.
Figure 6:
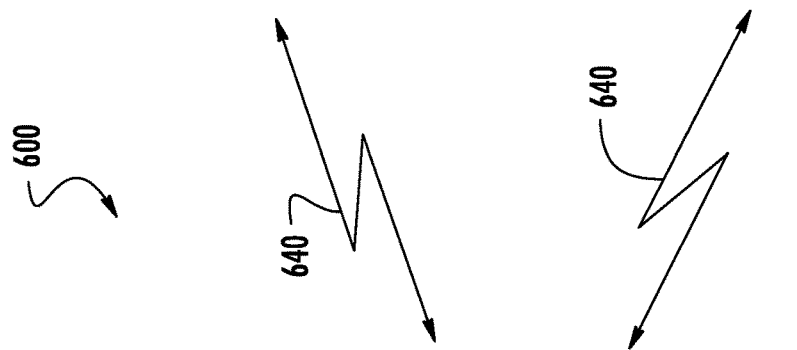
Figure 6:
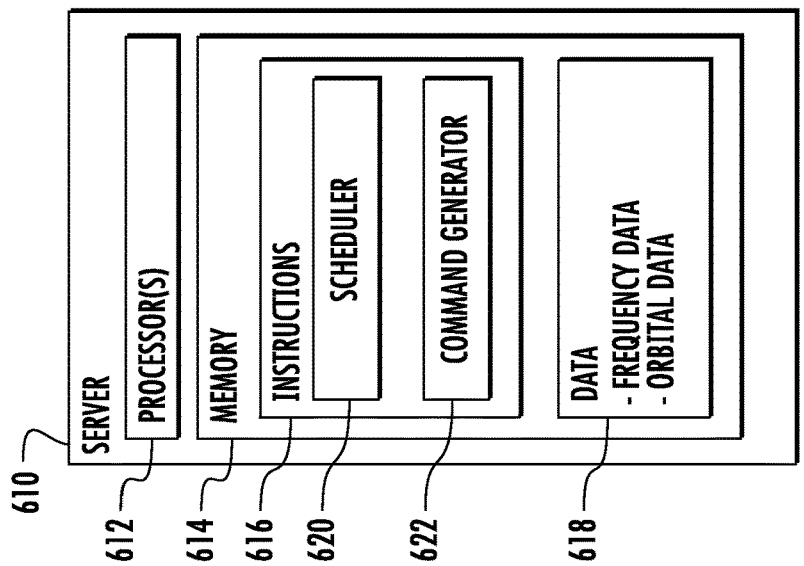

FIG. 6 depicts an example computing system 600 that can be used to implement the methods and systems according to example aspects of the present disclosure. The system 600 can be implemented using a client-server architecture that includes a server 610 that communicates with one or more satellite systems 630 using radio frequency transmission signals 640. The system 600 can be implemented using other suitable architectures, such as a single computing device.

The system 600 includes a server 610. The server 610 can be associated with a control system for providing control commands to one or more satellite systems 630. The server 610 can be implemented using any suitable computing device(s). The server 610 can have one or more processors 612 and one or more memory devices 614. The server 610 can also include a communication interface used to communicate with one or more satellite systems 630 over the network 640. The communication interface can include any suitable components for communicating with one or more satellite systems 630, including for example, transmitters, receivers, ports, controllers, antennas, or other suitable components.

The one or more processors 612 can include any suitable processing device, such as a microprocessor, microcontroller, integrated circuit, logic device, or other suitable processing device. The one or more memory devices 614 can include one or more computer-readable media, including, but not limited to, non-transitory computer-readable media, RAM, ROM, hard drives, flash drives, or other memory devices. The one or more memory devices 614 can store information accessible by the one or more processors 612, including computer-readable instructions 616 that can be executed by the one or more processors 612. The instructions 616 can be any set of instructions that when executed by the one or more processors 612, cause the one or more processors 612 to perform operations. For instance, the instructions 616 can be executed by the one or more processors 612 to implement the analysis system 314 and/or scheduler 304 described with reference to FIG. 3.

As shown in FIG. 6, the one or more memory devices 614 can also store data 618 that can be retrieved, manipulated, created, or stored by the one or more processors 612. The data 618 can include, for instance, frequency data, orbital data, and other data. The data 618 can be stored in one or more databases. The one or more databases can be connected to the server 610 by a high bandwidth LAN or WAN, or can also be connected to server 610 through various other suitable networks. The one or more databases can be split up so that they are located in multiple locales.

The server 610 can exchange data with one or more satellite systems 630 using radio frequency transmissions signals 640. Although two satellite systems 630 are illustrated in FIG. 6, any number of satellite systems 630 can be configured to communicate the server 610. Each of the satellite systems 630 can be any suitable type of satellite system, including satellites, mini-satellites, micro-satellites, nano-satellites, etc.

Similar to the server 610, a satellite system 630 can include one or more processor(s) 632 and a memory 634. The one or more processor(s) 632 can include one or more central processing units (CPUs). The memory 634 can include one or more computer-readable media and can store information accessible by the one or more processors 632, including instructions 636 that can be executed by the one or more processors 632 and data 638. For instance, the memory 634 can store instructions 636 for obtaining imagery data and downlinking the imagery data to a satellite ground communication station in accordance with a predetermined schedule.

The satellite system 630 can also include a communication interface used to communicate with one or more remote computing devices (e.g. server 610) using radio frequency transmission signals 640. The communication interface can include any suitable components for interfacing with one more remote computing devices, including for example, transmitters, receivers, ports, controllers, antennas, or other suitable components.

In some implementations, one or more aspects of communication among satellite system 630, server 610, and/or a ground communication station may involve communication through a network. In such implementations, the network can be any type of communications network, such as a local area network (e.g. intranet), wide area network (e.g. Internet), cellular network, or some combination thereof. The network can also include a direct connection between a satellite system 630 and the server 610. In general, communication through the network can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining a communication schedule for a satellite system, the method comprising:
   obtaining, by one or more computing devices, orbital data indicative of one or more orbital elements of a first satellite system and one or more second satellite systems;
   obtaining, by the one or more computing devices, frequency data indicative of one or more frequencies at which the one or more second satellite systems transmit data;
   determining, by the one or more computing devices, one or more expected radio frequency interference events associated with the first satellite system based at least in part on the orbital data and the frequency data, wherein the one or more expected radio frequency interference events are based at least in part on a position of one or more of the second satellite systems relative to the first satellite, and wherein determining the one or more expected radio frequency interference events further comprises determining at least one expected radio frequency interference event when the first satellite system and at least one of the second satellite systems are located at an angle relative to a ground communication station that is greater than a threshold elevation angle, wherein the threshold elevation angle is relative to the ground communication station; and
   scheduling, by the one or more computing devices, one or more transmission periods during which data is transmitted to or from the first satellite and one or more silent periods during which data is not transmitted to or from the first satellite based at least in part on the expected radio frequency interference events.

2. The computer-implemented method of claim 1, further comprising determining, by the one or more computing devices, one or more relevant satellite systems based at least in part on the frequency data.

3. The computer-implemented method of claim 2, wherein the one or more relevant satellite systems are satellite systems that transmit data within a threshold frequency range of the first satellite system.

4. The computer-implemented method of claim 2, further comprising determining, by the one or more computing devices, an orbital trajectory for the first satellite system and the one or more relevant satellite systems based at least in part on the orbital data.

5. The computer-implemented method of claim 1, further comprising determining, by the one or more computing devices, an orbital trajectory for the first satellite system and the one or more second satellite systems based at least in part on the orbital data.

6. The computer-implemented method of claim 1, wherein determining, by the one or more computing devices, one or more expected radio frequency interference events comprises determining, by the one or more computing devices, a threshold angle associated with the position of the first satellite to the at least one second satellite relative to the ground communication station.

7. The computer-implemented method of claim 6, wherein determining, by the one or more computing devices, one or more expected radio frequency interference events further comprises determining, by the one or more computing devices, the threshold elevation angle relative to the ground communication station.

8. The computer-implemented method of claim 6, wherein determining, by the one or more computing devices, one or more expected radio frequency interference events further comprises determining, by the one or more computing devices, a radio frequency interference event when the first satellite system and at least one of the second satellite systems the threshold angle associated with the position of the first satellite to the at least one second satellite relative to the ground communication station.

9. The computer-implemented method of claim 6, wherein the threshold angle associated with the position of the first satellite to the at least one second satellite relative to the ground communication station is determined based at least in part on a radiation pattern of an antenna configured to communicate with the first satellite system.

10. The computer-implemented method of claim 6, wherein the threshold angle associated with the position of the first satellite to the at least one second satellite relative to the ground communication station is determined based at least in part on a transmission power of an antenna configured to communicate with the first satellite system.

11. The computer-implemented method of claim 1, wherein scheduling, by the one or more computing devices, one or more transmission periods during which data is transmitted to or from the first satellite and one or more silent periods during which data is not transmitted to or from the first satellite based at least in part on the expected radio frequency interference events comprises updating a scheduling system associated with the first satellite system.

12. The computer-implemented method of claim 1, wherein the one or more silent periods correspond to the determined one or more radio frequency interference events.

13. The computer-implemented method of claim 12, wherein at least one of the one or more silent periods interrupts an otherwise continuous transmission period.

14. A computing system, comprising:
one or more processors; and
one or more memory devices, the one or more memory devices storing computer-readable instructions that when executed by the one or more processors cause the one or more processors to perform operations, the operations comprising:
obtaining orbital data indicative of one or more orbital elements of a first satellite system and one or more second satellite systems;
obtaining frequency data indicative of one or more frequencies at which the one or more second satellite systems transmit data;
determining one or more expected radio frequency interference events associated with the first satellite system based at least in part on the orbital data and the frequency data, wherein the one or more expected radio frequency interference events are based at least in part on a position of one or more second satellite systems relative to the first satellite, and wherein determining the one or more expected radio frequency interference events further comprises determining at least one expected radio frequency interference event when the first satellite system and at least one of the second satellite systems are located at an angle relative to a ground communication station that is greater than a threshold elevation angle, wherein the threshold elevation angle is relative to the ground communication station; and
scheduling one or more downlink periods during which data is transmitted by the first satellite and one or more silent periods during which data is not transmitted by the first satellite based at least in part on the expected radio frequency interference events.

15. The computing system of claim 14, the operations further comprising determining one or more relevant satellite systems based at least in part on the frequency data.

16. The computing system of claim 15, wherein the one or more relevant satellite systems comprise one or more second satellite systems that transmit data within a threshold frequency range of the first satellite system.

17. The computing system of claim 14, wherein determining one or more expected radio frequency interference events further comprises determining, by the one or more computing devices, a radio frequency interference event when the first satellite system and at least one of the second satellite systems are separated by an angle less than a threshold angle relative to an antenna configured to communicate with the first satellite system or the at least one of the second satellite systems.

18. One or more tangible, non-transitory computer-readable media storing computer-readable instructions that when executed by one or more processors cause the one or more processors to perform operations, the operations comprising:
obtaining orbital data indicative of one or more orbital elements of a first satellite system and one or more second satellite systems;
obtaining frequency data indicative of one or more frequencies at which the one or more second satellite systems transmit data;
determining one or more expected radio frequency interference events associated with the first satellite system based at least in part on the orbital data and the frequency data, wherein the one or more expected radio frequency interference events are based at least in part on a position of one or more second satellite systems relative to the first satellite, and wherein determining the one or more expected radio frequency interference events further comprises determining at least one expected radio frequency interference event when the first satellite system and at least one of the second satellite systems are located at an angle relative to a ground communication station that is greater than a threshold elevation angle, wherein the threshold elevation angle is relative to the ground communication station; and scheduling one or more downlink periods during which data is transmitted by the first satellite and one or more silent periods during which data is not transmitted by the first satellite based at least in part on the expected radio frequency interference events.

19. The one or more tangible, non-transitory computer-readable media of claim 18, wherein the one or more silent periods correspond to a period of time associated with the determined one or more radio frequency interference events.

20. The one or more tangible, non-transitory computer-readable media of claim 19, wherein at least one of the one or more silent periods interrupts an otherwise continuous downlink period.

* * * * *